United States Patent
Moore et al.

(10) Patent No.: US 7,616,431 B2
(45) Date of Patent: Nov. 10, 2009

(54) ELECTRICAL ENCLOSURE AND SUPPORT ASSEMBLY THEREFOR

(75) Inventors: Stanley E. Moore, Weaverville, NC (US); Amy W. Rowell, Asheville, NC (US); Michael H. Abrahamsen, Hendersonville, NC (US)

(73) Assignee: Eaton Corporation, Cleveland, OH (US)

( * ) Notice: Subject to any disclaimer, the term of this patent is extended or adjusted under 35 U.S.C. 154(b) by 62 days.

(21) Appl. No.: 11/934,312

(22) Filed: Nov. 2, 2007

(65) Prior Publication Data
US 2009/0116175 A1 May 7, 2009

(51) Int. Cl.
*H02B 1/20* (2006.01)
(52) U.S. Cl. ............... 361/611; 174/68.2; 174/149 B; 174/90 B; 361/648; 361/650; 361/825
(58) Field of Classification Search ............... 174/68.2, 174/70 B, 71 B, 149 B, 99 B; 361/637–640, 361/648–650; 439/212–213
See application file for complete search history.

(56) References Cited

U.S. PATENT DOCUMENTS

| | | | |
|---|---|---|---|
| 3,562,593 A * | 2/1971 | Bould ..................... 361/614 |
| 3,746,817 A * | 7/1973 | Drown et al. ............. 200/307 |
| 4,136,374 A * | 1/1979 | Rosey et al. ............. 361/614 |
| 6,040,976 A | 3/2000 | Bruner et al. |
| 6,111,745 A | 8/2000 | Wilkie, II et al. |
| 6,169,248 B1 * | 1/2001 | Rowe et al. ................ 174/50 |
| 6,549,428 B1 * | 4/2003 | Fontana et al. ............ 361/825 |
| 7,173,810 B2 | 2/2007 | Rowe et al. |
| 7,173,811 B2 * | 2/2007 | Abrahamsen et al. ....... 361/652 |
| 7,227,740 B2 | 6/2007 | Johnson |
| 7,433,205 B2 * | 10/2008 | Fontana et al. ............ 361/825 |
| 7,450,368 B2 * | 11/2008 | Parker et al. ............. 361/611 |
| 2006/0002056 A1 * | 1/2006 | Abrahamsen et al. ....... 361/652 |

* cited by examiner

*Primary Examiner*—Gregory D Thompson
(74) *Attorney, Agent, or Firm*—Martin J. Moran (57) ABSTRACT

A support assembly is provided for an electrical enclosure including a housing having first and second opposing sides, electrical bus members, and at least one electrical switching apparatus, such as a circuit breaker. Each of the electrical bus members is electrically connectable to a corresponding one of the circuit breakers. The support assembly includes at least one support member having first and second opposing ends, first and second opposing edges, and a plurality of apertures extending from the first edge toward the second edge and receiving the electrical bus members. A fastener assembly supports the support member(s) between the first and second sides of the housing. Each support member extends only a portion of the width between the first and second sides of the housing, and supports the electrical bus members, without being attached to the housing at a location between the first and second sides thereof.

17 Claims, 6 Drawing Sheets

ELECTRICAL ENCLOSURE AND SUPPORT ASSEMBLY THEREFOR

BACKGROUND OF THE INVENTION

1. Field of the Invention

The invention relates generally to electrical enclosures and, more particularly to support assemblies for electrical enclosures.

2. Background Information

Electrical switching apparatus include, for example, circuit switching devices and circuit interrupters such as circuit breakers, contactors, motor starters, motor controllers and other load controllers.

Low voltage (e.g., without limitation, up to about 690 VAC; any suitable low voltage) circuit breakers, for example, which are used in power distribution systems, are commonly mounted, either alone or in combination with additional switchgear, within an electrical enclosure (e.g., without limitation, a load center; a switchgear cabinet). Typically, each circuit breaker is disposed within its own section of the electrical enclosure, referred to as a cell. Such circuit breakers can be relatively large and, therefore, are typically configured in a draw-out arrangement in which the circuit breaker is mounted on a movable frame or cassette that can be drawn out of the cell in order to, for example, gain access to the electrical terminals and bus work on the back side of the circuit breaker. Drawing the circuit breaker out of the housing assembly also provides access to the bus members, which are generally disposed behind the circuit breaker.

More specifically, the electrical enclosure contains current-carrying conductors, known as runbacks, which feed electrical power to, or carry electrical power from, the circuit breaker. The runbacks are contained by a support, which must be adequately designed with electrically insulating features to resist phase-to-phase contact or ground contact during normal operation of the circuit breaker. Known runback supports span the full width of the circuit breaker cell. Thus, when two circuit breakers are mounted side-by-side, either an elongated single-piece runback support is employed, which spans the full width of the electrical enclosure (e.g., across two cells that are arranged side-by-side), or two independent runback supports and an intermediate metal framework disposed between the circuit breakers and the two independent runback supports are required, wherein the intermediate metal framework supports one end of each of the runback supports, and the other end is supported by a corresponding wall or exterior framework of the electrical enclosure.

Both runback support designs suffer from a number of disadvantages. The single-piece runback support is relatively large, requiring a correspondingly large mold to make the support. This increases tool and part costs, and decreases the number of different circuit breaker configurations for which the single-piece runback support can be employed. It is also underutilized in the event only one circuit breaker is employed instead of two circuit breakers, in the aforementioned side-by-side configuration. Among the disadvantages of the intermediate metal framework and two independent runback supports, is the potential for unintentional grounding presented by the intermediate metal framework. Such framework also takes up valuable internal space within the electrical enclosure. Additionally, in the event only one circuit breaker is employed, a relatively large mold is needed to fill the empty space (e.g., cell) adjacent the single circuit breaker, in order to fill the empty cell of the electrical enclosure and thereby maintain the support across the width of the electrical enclosure.

A still further disadvantage is that known runbacks and runback supports require an excessive amount of hardware (e.g., without limitation, brackets, bolts, washers, nuts and combinations of bolts, washers and/or nuts) to secure the components of the assembly together. Typically, such hardware is electrically conductive and can encroach on minimum electrical clearance requirements (e.g., without limitation, "through-the-air" minimum clearance requirements, as defined herein; "across-the-surface" minimum clearance requirements, as defined herein), which are mandated by regulation.

There is, therefore, room for improvement in electrical enclosures and in support assemblies therefor.

SUMMARY OF THE INVENTION

These needs and others are met by embodiments of the invention, which are directed to a self-supporting modular support assembly for supporting electrical bus members of electrical switching apparatus, such as circuit breakers, which are housed in an electrical enclosure (e.g., without limitation, a load center; a switchgear cabinet).

As one aspect of the invention, a support assembly is provided for an electrical enclosure. The electrical enclosure includes a housing having a first side and a second side disposed opposite and distal from the first side, a plurality of electrical bus members, and at least one electrical switching apparatus structured to be disposed between the first side of the housing and the second side of the housing. The housing has a width between the first side and the second side. Each of the electrical bus members is structured to be electrically connected to a corresponding one of the at least one electrical switching apparatus. The support assembly comprises: at least one support member including a first end, a second end disposed opposite and distal from the first end, a first edge, a second edge disposed opposite and distal from the first edge, and a plurality of apertures extending from the first edge toward the second edge and being structured to receive the electrical bus members; and a fastener assembly structured to support the at least one support member between the first side of the housing of the electrical enclosure and the second side of the housing. Each support member is structured to extend only a portion of the width between the first side of the housing of the electrical enclosure and the second side of the housing and to support the electrical bus members, without being attached to the housing of the electrical enclosure at a location between the first side of the housing and the second side of the housing.

The at least one support member may be a first support member and a second support member, wherein the first end of the first support member is structured to be coupled to the first side of the housing of the electrical enclosure, the second end of the first support member is coupled to the first end of the second support member, and the second end of the second support member is structured to be coupled to the second side of the housing of the electrical enclosure. The first support member and the second support member may be substantially identical. The second end of the first support member may comprise a number of first tabs and the first end of the second support member may comprise a number of second tabs, wherein the number of second tabs at least partially overlaps the number of first tabs. The width of the housing of the electrical enclosure may be about 22 inches, and the at least one support member may have a width of about 11 inches.

The fastener assembly may comprise a plate member and a plurality of fasteners. The plate member may overlap the second end of the first support member and the first end of the second support member, and a number of the fasteners may be inserted through the plate member and at least one of the first support member and the second support member in order to fasten the first support member to the second support member. The second end of the first support member may comprise a number of first protrusions, the first end of the second support member may comprise a number of second protrusions, and the plate member may include a number of first apertures and a number of second apertures. When the first support member and the second support member are disposed in a predetermined orientation, each of the number of first protrusions may be disposed in a corresponding one of the number of first apertures and each of the number of second protrusions may be disposed in a corresponding one of the number of second apertures.

The at least one support member may be a single support member, and the fastener assembly may comprise a spacer and a plurality of fasteners. The first end of the single support member may be structured to be coupled to the first side of the housing of the electrical enclosure, the second end of the single support member may be coupled to the spacer, and the spacer may be structured to be coupled to the second side of the housing of the electrical enclosure.

As another aspect of the invention, an electrical enclosure comprises: a housing having a first side, a second side disposed opposite and distal from the first side, and a width between the first side and the second side; a plurality of electrical bus members; at least one electrical switching apparatus disposed between the first side of the housing and the second side of the housing, each of the electrical bus members being electrically connectable to a corresponding one of the at least one electrical switching apparatus; and a support assembly comprising: at least one support member including a first end, a second end disposed opposite and distal from the first end, a first edge, a second edge disposed opposite and distal from the first edge, and a plurality of apertures extending from the first edge toward the second edge and receiving the electrical bus members, and a fastener assembly supporting the at least one support member between the first side of the housing of the electrical enclosure and the second side of the housing. Such support member extends only a portion of the width between the first side of the housing of the electrical enclosure and the second side of the housing, and supports the electrical bus members, without being attached to the housing of the electrical enclosure at a location between the first side of the housing and the second side of the housing.

As another aspect of the invention, an electrical enclosure comprises: a housing having a first side, a second side disposed opposite and distal from the first side, and a width between the first side and the second side; a plurality of electrical bus members; at least one electrical switching apparatus disposed between the first side of the housing and the second side of the housing, each of the electrical bus members being electrically connectable to a corresponding one of the at least one electrical switching apparatus; and a support assembly comprising: at least one support member including a first end, a second end disposed opposite and distal from the first end, a first edge, a second edge disposed opposite and distal from the first edge, and a plurality of apertures extending from the first edge toward the second edge and receiving the electrical bus members, and a fastener assembly supporting the at least one support member between the first side of the housing of the electrical enclosure and the second side of the housing. Such support member supports the electrical bus members, and extends only a portion of the width between the first side of the housing of the electrical enclosure and the second side of the housing. The width of the housing of the electrical enclosure is about 44 inches, and the at least one support member has a width of about 22 inches.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

For purposes of illustration, embodiments of the invention will be described as applied to a low voltage circuit breaker, although it will become apparent that they could also be applied to support and insulate the electrical bus members of any other known or suitable electrical switching apparatus (e.g., without limitation, circuit breakers other than low voltage circuit breakers; contactors; motor starters; motor controllers; and other load controllers) housed within an electrical enclosure (e.g., without limitation, a load center; a switchgear cabinet).

Directional phrases used herein, such as, for example, left, right, front, back, top, bottom and derivatives thereof, relate to the orientation of the elements shown in the drawings and are not limiting upon the claims unless expressly recited therein.

As employed herein, the term "self-supporting" refers to the fact that the support members of the disclosed support assembly are not mounted to the electrical enclosure at any location between the first and second sides of the housing of the electrical enclosure for the purpose of providing structural support of the support member. Rather, a plurality of support members or a support member and a spacer are coupled together in a unique manner which supports the electrical bus members while avoiding the requirement of being mounted to a separate intermediate framework of the electrical enclosure.

As employed herein, the term "electrical bus" or "electrical bus member" means a rigid conductor which carries or transfers voltage, current and/or power.

As employed herein, the term "runback" refers to an electrical bus member which extends generally horizontally with respect to an electrical enclosure, is electrically connectable to an electrical switching apparatus, and is supported by the disclosed support assembly.

As employed herein, the term "through-the-air" refers to the minimum allowable straight line clearance (i.e., distance) requirement between two electrically conductive fasteners of different potentials.

As employed herein, the term "across-the-surface" refers to the shortest allowable clearance (i.e., distance) requirement between two electrically conductive fasteners of different potentials, assuming the electrical current has to pass over the surface of any component(s) that are disposed between the two electrically conductive fasteners, as opposed to traveling through-the-air.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" refers to the quantity one or an integer greater than one (i.e., a plurality).

Figure 1:
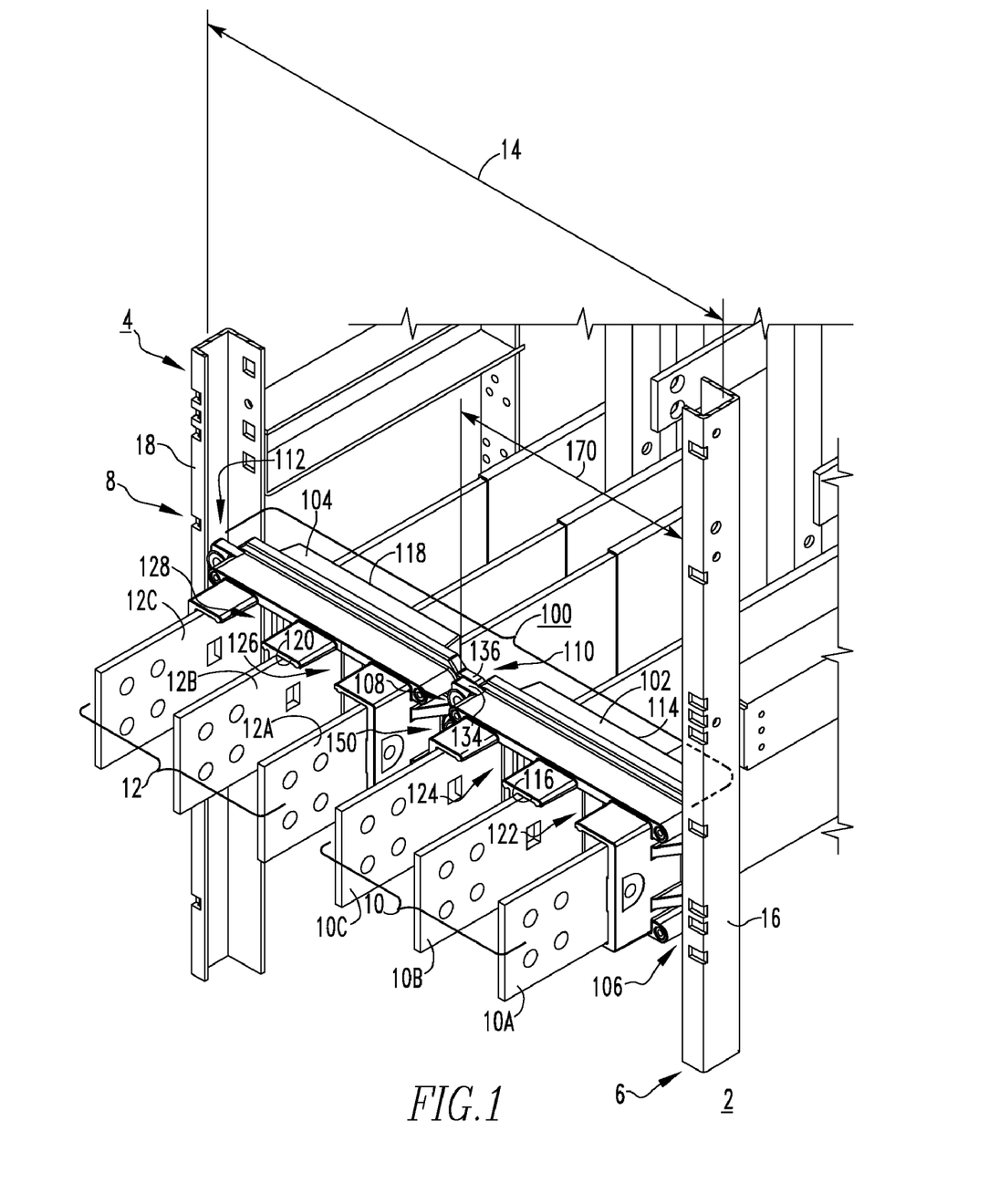
FIG. 1 is a partially exploded isometric view of a portion of an electrical enclosure and a support assembly therefor, in accordance with an embodiment of the invention, also showing a circuit breaker in simplified form.
Figure 5:
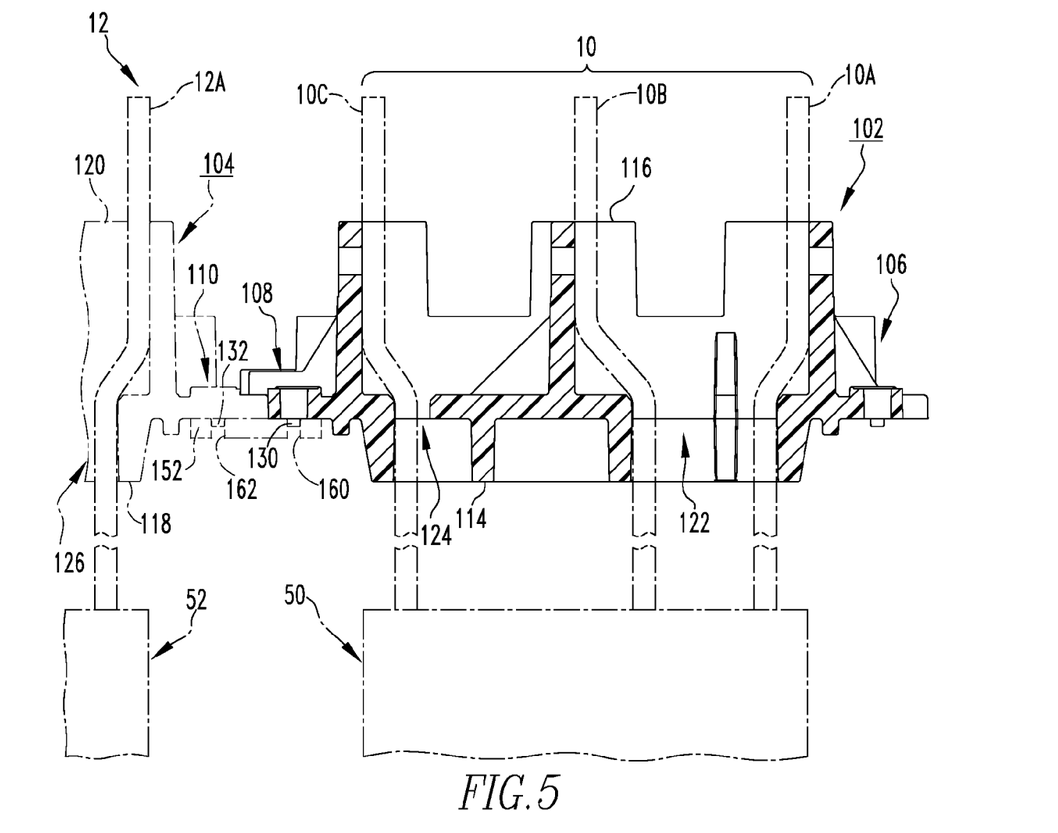
FIG. 5 is a sectional view taken along line 5-5 of FIG. 4.

FIG. 1 shows a support assembly 100 for an electrical enclosure 2, such as a switchgear cabinet, which is partially shown. The electrical enclosure 2 includes a housing 4 having first and second opposing sides 6,8, a plurality of electrical bus members 10,12, and at least one electrical switching apparatus 50,52 (see, for example, the two circuit breakers, which are partially shown in simplified form in phantom line drawing in FIG. 5). As will be discussed in greater detail hereinbelow, each of the electrical bus members 10,12 is structured to be electrically connected to a corresponding one of the circuit breakers 50,52 (FIG. 5).

Figure 2:
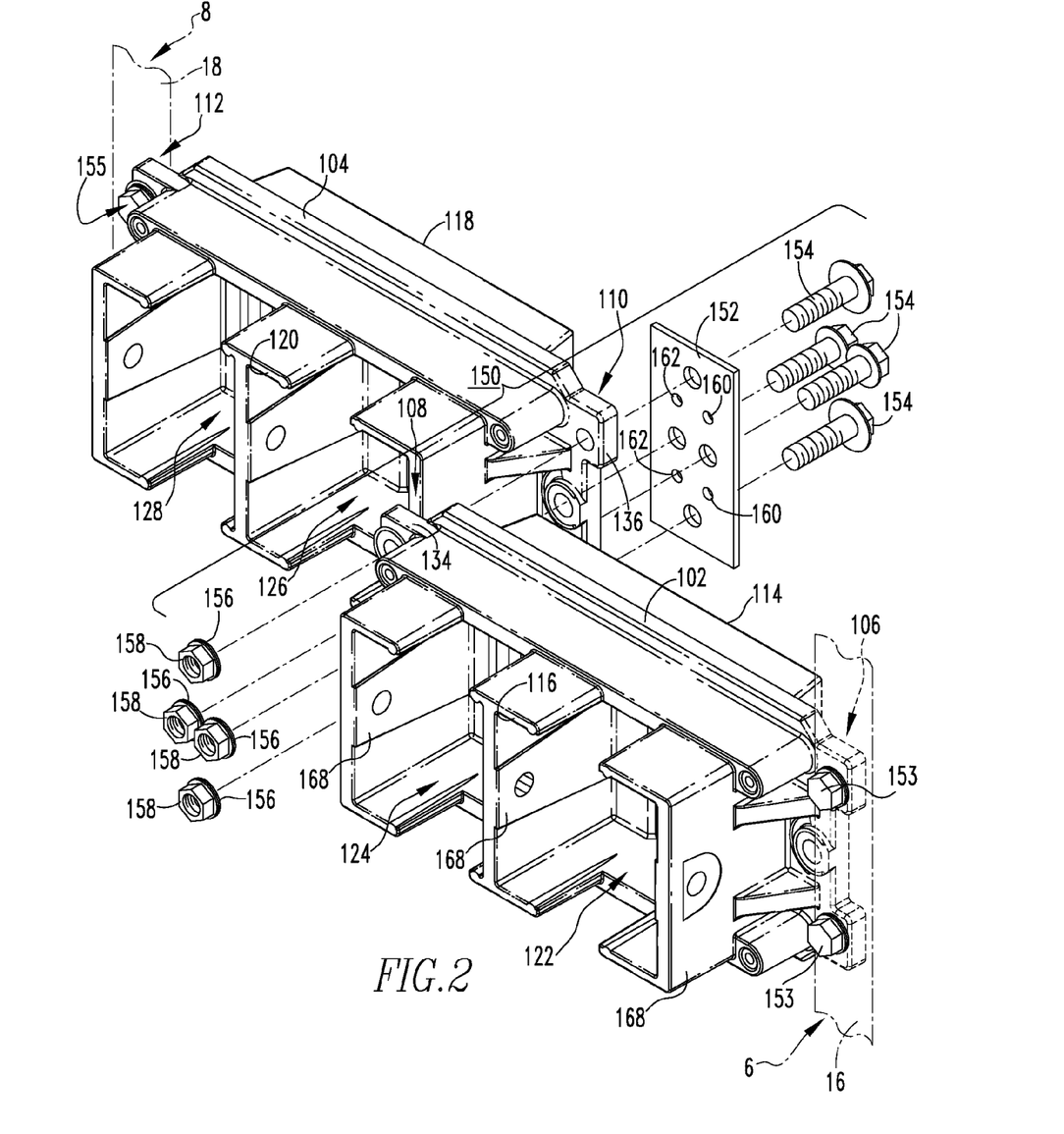
FIG. 2 is an exploded isometric view of the support assembly of FIG. 1.

The support assembly 100 includes at least one support member 102 (first and second support members 102,104 are shown; see also support member 202 of FIG. 7, discussed hereinbelow). In the example of FIGS. 1 and 2, each of the first and second support members 102,104, respectively, includes a first end 106,110, a second end 108,112 disposed opposite and distal from the first end 106,110, a first edge 114,118, a second edge 116,120, and a plurality of apertures 122,124,126,128 extending from the first edge 114,118 toward the second edge 116,120. The apertures 122,124,126, 128 are structured to receive the electrical bus members 10,12, as shown in FIG. 1. A fastener assembly 150, which is best shown in FIG. 2, is structured to support the support members 102,104 between the first and second sides 6,8 of the electrical enclosure housing 4. Each of the support members 102,104 (see also support member 202 of FIG. 7, discussed hereinbelow) extends only a portion of the width 14 between the first and second sides 6,8 of the housing 4. The fastener assembly 150 enables the support members 102,104 to support the electrical bus members 10,12, without requiring the support assembly 100 to be attached to the housing 4 of the electrical enclosure 2 at a location between the first and second sides 6,8 of the housing 4. In other words, among the unique features of the disclosed support assembly 100 is that it eliminates the need for an intermediate framework (not shown) attached to the housing 4 disposed between the first and second sides 6,8 of the electrical enclosure housing 4, which is required by the prior art in order to provide sufficient support for the assembly.

More specifically, in one non-limiting example, which is illustrated in FIG. 1, the first side 6 of the electrical enclosure housing 4 comprises a first frame 16 and the second side 8 of the electrical enclosure housing 4 comprises a second frame 18, wherein the housing 4 is devoid of any intermediate framework between the first and second frames 16,18, as shown. Thus, the support assembly 100 is coupled only to the first and second frames 16,18. As previously discussed, the electrical enclosure 2 includes first and second circuit breakers 50,52 (partially shown in simplified form in phantom line drawing in FIG. 5). The exemplary circuit breakers 50,52 (FIG. 5) are three-phase circuit breakers, although it will be appreciated that any known or suitable alternative electrical switching apparatus having any suitable number of phases could be alternatively employed, without departing from the scope of the invention. As shown in FIG. 1, the plurality of electrical bus members includes a first plurality of runbacks 10, which are electrically connectable to the first circuit breaker 50 (FIG. 5) and a second plurality of runbacks 12, which are electrically connected to the second circuit breaker 52 (FIG. 5). The support assembly 100 in the example of FIG. 1 includes a first support member 102 and a second support member 104 disposed beside and coupled to the first support member 102 behind (from the perspective of FIG. 1) the circuit breakers 50,52 (FIG. 5), and between the first and second sides 6,8 of the electrical enclosure housing 4. Each runback 10A,10B,10C of the first plurality of runbacks 10 extends through a corresponding one of the apertures 122,124 of the first support member 102. Likewise, each runback 12A,12B,12C of the second plurality of runbacks 12 extends through a corresponding one of the apertures 126,128 of the second support member 104. Specifically, in the example shown and described herein, runbacks 10A and 10B extend through aperture 122 and runback 10C extends through aperture 124, and runbacks 12A and 12B extend through aperture 126 and runback 12C extends through aperture 128. In this manner, when the first support member 102 is coupled to the first side 6 of the electrical enclosure housing 4, and the second support member 104 is coupled to the second side 8 of the housing 4 as well as to the first support member 102, the support assembly 100 supports both the first and second pluralities of runbacks 10,12.

The first and second support members 102,104 of the example support assembly 100 are preferably at least substantially identical. Thus, the tooling and associated cost for making the support assembly 100 is minimized, for example, because one component is repetitively produced, enabling the use of smaller tools (e.g., without limitation, dies), as opposed to one large component that would require larger tools (e.g., without limitation, dies) at an increased cost. Additionally, by using a smaller support member (e.g., without limitation, 102,104) in replication, the support members 102,104 can be employed under a variety of circumstances in a wide array of different applications, without requiring separate individual and customized components to be made for each particular circumstance. For example, although two support members 102,104 are shown side-by-side in the example of FIGS. 1 and 2, it will be appreciated that any known or suitable alternative number and/or combination of support members could be employed. In one non-limiting example, the width 14 (FIG. 1) of the electrical enclosure 2, between the first and second sides 6,8 thereof, is about 22 inches, whereas the width 170 (FIG. 1; see also width 270 of FIG. 7) of each support member 102 is about 11 inches. It will, however, be appreciated that any known or suitable alternative size of enclosure 2 and support member (e.g., without limitation, 102,104) therefor, could be employed without departing from the scope of the invention. It will also be appreciated that although the support members 102,104 are contemplated as being made from a suitable electrically insulative material such as, for example and without limitation, a suitable plastic material, that they could be made from any known or suitable alternative material or combination of materials.

Where two support members 102,104 are employed side-by-side, as shown in FIGS. 1 and 2, the first end 106 of the support member 102 is coupled to the first side 6 of the housing 4, the second end 108 of the first support member 102 is coupled to the first end 110 of the second support member 104, and the second end 112 of the second member 104 is coupled to the second side 8 of the housing 4. As best shown in FIG. 2, the fastener assembly 150 includes a plate member 152 and a plurality of fasteners 154. The plate member 152 overlaps the second end 108 of the first support member 102 and the first end 110 of the second support member 104 (see also FIG. 5). The fasteners 154 (four are shown) are inserted through the plate member 152 and the first and second support members 102,104 in order to fasten the first and second support members 102,104 together.

Figure 3:
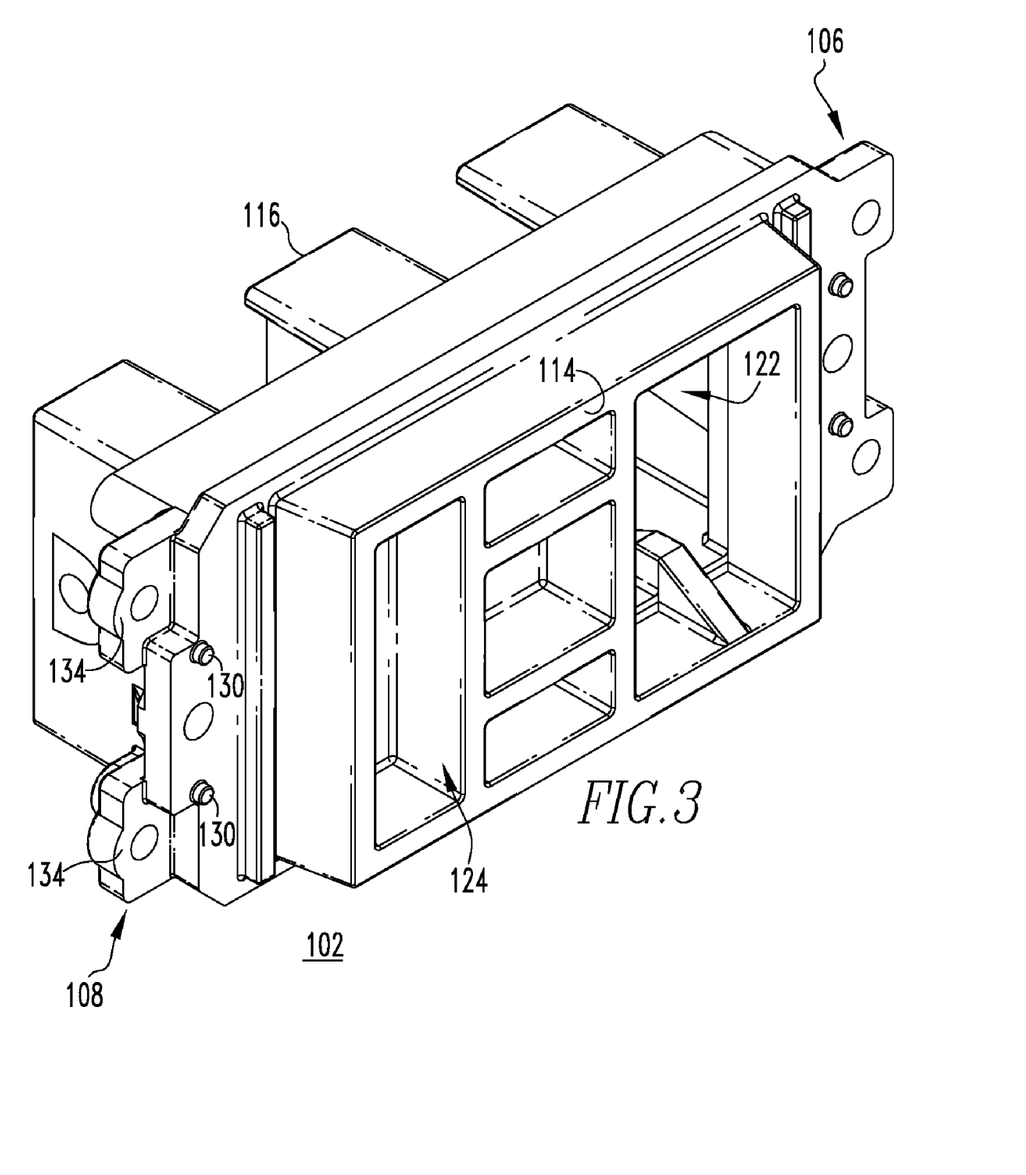
FIG. 3 is an isometric view of one of the support members for the support assembly of FIG. 2.
Figure 4:
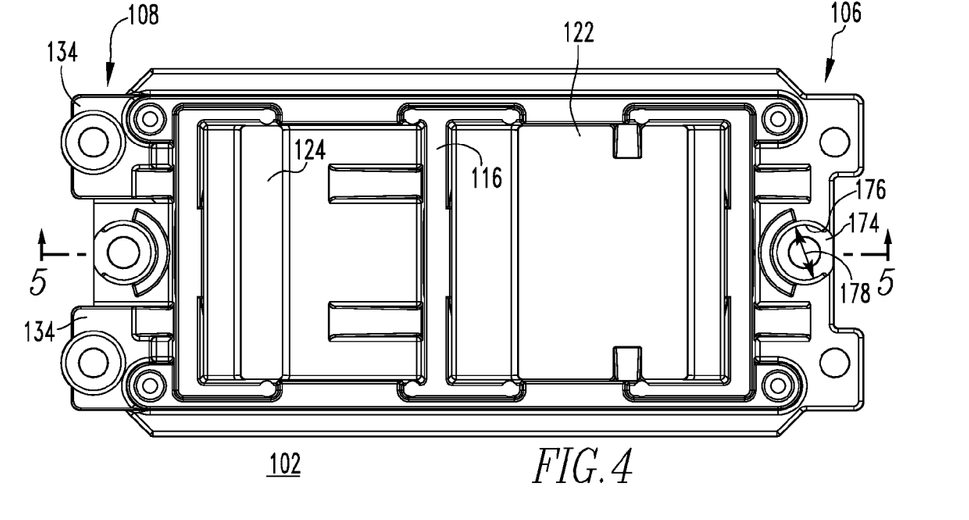
FIG. 4 is a bottom plan view of the support member of FIG. 3.
Figure 6:
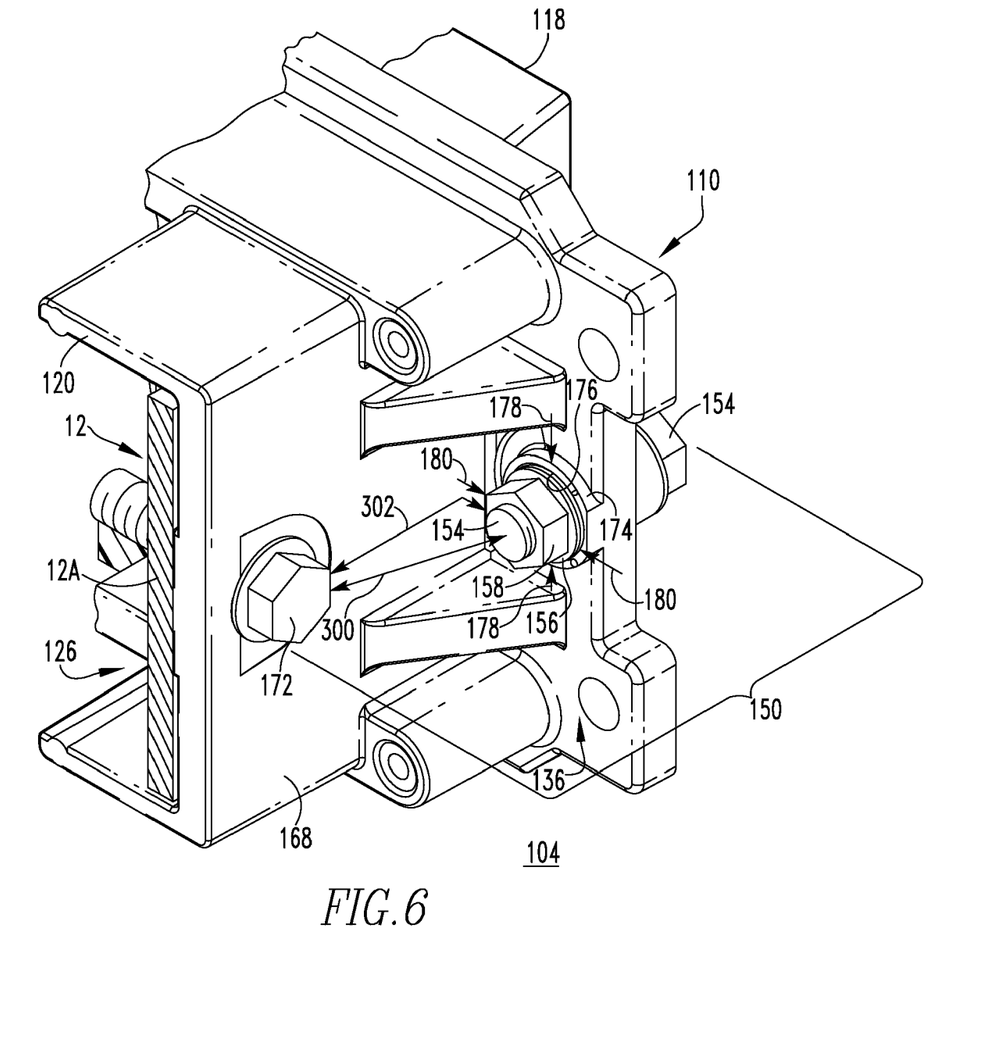
FIG. 6 is an assembled close-up isometric view of a portion of the support assembly of FIG. 2.

More specifically, as shown in FIGS. 3 and 5, the second end 108 of the first support member 102 includes a number of first protrusions 130 (two are shown). The first end 110 of the second support member 104 (FIG. 5), which is identical to the first end 106 of first support member 102 shown in FIG. 3, includes a number of second protrusions 132 (one is shown in the sectional view of FIG. 5). The plate member 152, which is shown in phantom line drawing in FIG. 5, includes a number of first apertures 160 and a number of second apertures 162. More specifically, as shown in the example of FIG. 2, the example plate member 152 includes two first apertures 160 and two second apertures 162. When the first and second support members 102,104 are disposed in a predetermined orientation (see, for example FIG. 1; also partially shown in FIG. 5), each of the first protrusions 130 is disposed in a corresponding one of the first apertures 160 of the plate member 152, and each of the second protrusions 132 is disposed in a corresponding one of the second apertures 162. In this manner, the plate member 152 of the fastener assembly 150 both ensures proper alignment and orientation of the first and second support members 102,104, and provides structural support for the connection between the ends 108,110 thereof. Further structural support is provided by the fact that the second end 106 of the first support member 102 includes a number of first tabs 134, which are at least partially overlapped by a number of second tabs 136 of the second support member 104, as best shown in FIG. 1. Tabs 134 are also shown in FIGS. 2, 3 and 4, and tabs 136 are also shown in FIGS. 2 and 6. It will be appreciated that any known or suitable number and/or configuration of tabs 134,136 (both shown in FIG. 1) and protrusions 130,132 (both shown in FIG. 5) could be employed.

Referring again to FIG. 2, it will be appreciated that, in addition to the foregoing, the first end 106 of the first support member 102 is fastened to the first side 6 (partially shown in phantom line drawing) of the electrical enclosure housing 4 (FIG. 1) by a number of first fasteners 153 (two are shown). The second fasteners 154, which were previously discussed, fasten the second end 108 of the first support member 102 to the first end 110 of the second support member 104, and a number of third fasteners 155 (one is shown in FIG. 2) fasten the second end 112 of the second support member 104 to the second side 8 (partially shown in phantom line drawing in FIG. 2) of the electrical enclosure housing 4 (FIG. 1). It will, however, be appreciated that any known or suitable alternative number, type and/or configuration of fasteners or fastening mechanisms could be alternatively employed.

FIG. 6 shows an enlarged view of the first end 110 of the second support member 104 and a portion of the fastener assembly 150 therefor. One of the electrical bus members 12A, is also partially shown in cross-section. The first end 110 of the second support member 104 includes the aforementioned tab 136, which extends outwardly from the support member 104 at or about the first edge 118 thereof. A number of walls 168 (one is shown) (see also walls 168 of first support member 102 of FIG. 2) extend generally perpendicularly from the first edge 118 toward the second edge 120. A first one 154 of the fasteners 154,172 of the fastener assembly 150 extends through the tab 136, and a second one 172 of the fasteners 154,172 extends through one of the walls 168, in order to fasten a corresponding one 12A of the electrical bus members 12 to the support member 104. The first fastener 154 and the second fastener 172 are separated by a number of predetermined minimum distances, such as for example and without limitation, the through-the-air and across-the-surface clearances 300 and 302, respectively, which are shown. In one non-limiting example of the disclosed support assembly 100, the through-the-air clearance 300 is at least one inch and the across-the-surface clearance 302 is at least two inches. It will be appreciated that it is important to sufficiently separate the fasteners 154,172, because they are at different potentials and it is desirable to avoid unintentional arcing that could otherwise occur therebetween. The example support member 104 achieves the desired predetermined minimum distances (e.g., through-the-air clearance 300 and across-the-surface clearance 302) by providing a projection 174, which extends outwardly from the tab 136 of the support member 104 and includes a recess 176 having a predetermined first diameter 178 (also shown in FIG. 4). More specifically, the first fastener 154 includes a washer 156, which has a predetermined second diameter 180. The predetermined second diameter 180 of the washer 156 is substantially the same as the first diameter 178 of the recess 176, in order to ensure that only washers 156 having such predetermined second diameter 180 can be received in the recess 176. This structure ensures that the predetermined minimum distances 300,302 are maintained.

Figure 7:
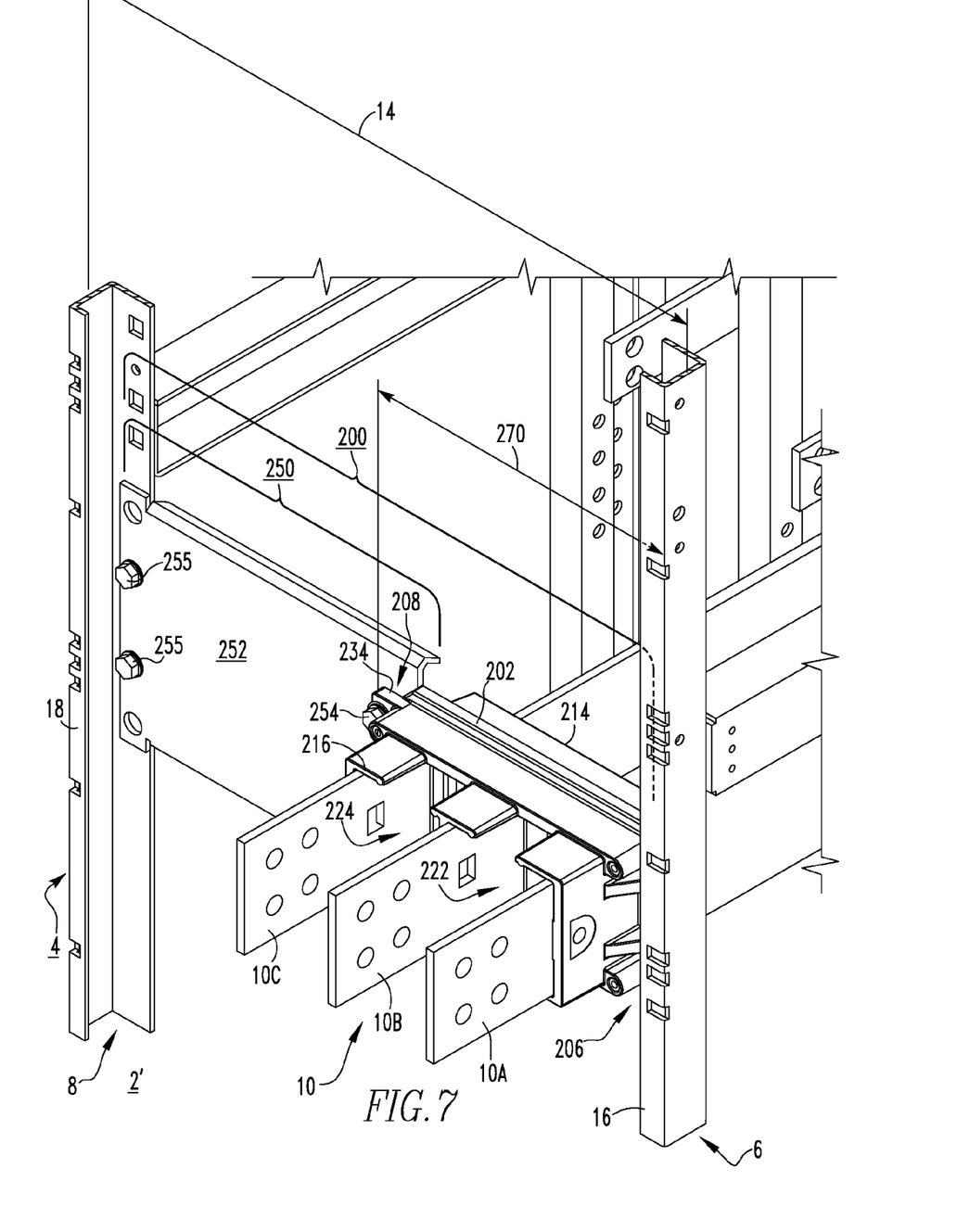
FIG. 7 is an isometric view of a portion of an electrical enclosure and a support assembly therefor, in accordance with another embodiment of the invention.

FIG. 7 shows one non-limiting alternative embodiment of a support assembly 200 in accordance with the invention. The support assembly 200 includes a single support member 202, which is substantially identical to the support members 102, 104 previously discussed hereinabove. However, the fastener assembly 250 of the support assembly 200 includes a spacer 252 rather than a second support member (not shown). Thus, it will be appreciated that the disclosed support assembly 200 can be conveniently utilized, for example, even where only one circuit breaker 50 (FIG. 5) is employed. The first end 206 of the single support member 202 is coupled to the first side 6 of the electrical enclosure housing 4, and the second end 208 of the single support member 202 is coupled to the spacer 252 using a plurality of fasteners 254 (one is shown in FIG. 7). The spacer 252 is coupled to the second side 8 of the housing 4 of the electrical enclosure 2' using a plurality of fasteners 255 (two are shown).

Accordingly, the disclosed support assembly 100,200 provides a mechanism for supporting the runbacks 10,12 of electrical switching apparatus (e.g., without limitation, circuit breakers 50,52), without requiring any intermediate framework (not shown) between the first and second frames 16,18 of the electrical enclosure 2,2', and without requiring an excessively large support member (not shown) which must span the full width 14 (FIG. 1) between the first and second sides 6,8 of the electrical enclosure housing 4. The support assembly also enables the positioning of a plurality of such electrical switching apparatus 50,52 (FIG. 5) in close proximity with respect to one another within the electrical enclosure 2,2', and while providing sufficient electrical insulation and/or clearances between electrically conductive components of the electrical enclosure 2,2'.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A support assembly for an electrical enclosure, said electrical enclosure including a housing having a first side and a second side disposed opposite and distal from the first side, a plurality of electrical bus members, and at least one electrical switching apparatus structured to be disposed between the first side of said housing and the second side of said housing, said housing having a width between the first side and the second side, each of said electrical bus members being structured to be electrically connected to a corresponding one of said at least one electrical switching apparatus, said support assembly comprising:

at least one support member, said at least one support member including a first end, a second end disposed opposite and distal from the first end, a first edge, a second edge disposed opposite and distal from the first edge, and a plurality of apertures extending from the first edge toward the second edge, said apertures being structured to receive said electrical bus members; and a fastener assembly structured to support said at least one support member between the first side of said housing of said electrical enclosure and the second side of said housing, wherein each of said at least one support member is structured to extend only a portion of the width between the first side of said housing of said electrical enclosure and the second side of said housing, wherein said at least one support member is structured to support said electrical bus members, without being attached to said housing of said electrical enclosure at a location between the first side of said housing and the second side of said housing, wherein said at least one support member is a first support member and a second support member; wherein the first end of said first support member is structured to be coupled to the first side of said housing of said electrical enclosure; wherein the second end of said first support member is coupled to the first end of said second support member; and wherein the second end of said second support member is structured to be coupled to the second side of said housing of said electrical enclosure, and wherein said fastener assembly comprises a plate member and a plurality of fasteners; wherein said plate member overlaps the second end of said first support member and the first end of said second support member; and wherein a number of said fasteners is inserted through said plate member and at least one of said first support member and said second support member in order to fasten said first support member to said second support member.

2. The support assembly of claim 1 wherein the second end of said first support member comprises a number of first protrusions; wherein the first end of said second support member comprises a number of second protrusions; wherein said plate member includes a number of first apertures and a number of second apertures; and wherein, when said first support member and said second support member are disposed in a predetermined orientation, each of said number of first protrusions is disposed in a corresponding one of said number of first apertures and each of said number of second protrusions is disposed in a corresponding one of said number of second apertures.

3. The support assembly of claim 1 wherein said fasteners comprise a number of first fasteners, a number of second fasteners, and a number of third fasteners; wherein said number of first fasteners is structured to fasten the first end of said first support member to the first side of said housing of said electrical enclosure; wherein said number of second fasteners fasten the second end of said first support member to the first end of said second support member; and wherein said number of third fasteners is structured to fasten the second end of said second support member to the second side of said housing of said electrical enclosure.

4. The support assembly of claim 1 wherein said first support member and said second support member are substantially identical.

5. The support assembly of claim 1 wherein the second end of said first support member comprises a number of first tabs; wherein the first end of said second support member comprises a number of second tabs; and wherein said number of second tabs at least partially overlaps said number of first tabs.

6. A support assembly for an electrical enclosure, said electrical enclosure including a housing having a first side and a second side disposed opposite and distal from the first side, a plurality of electrical bus members, and at least one electrical switching apparatus structured to be disposed between the first side of said housing and the second side of said housing, said housing having a width between the first side and the second side, each of said electrical bus members being structured to be electrically connected to a corresponding one of said at least one electrical switching apparatus, said support assembly comprising:

at least one support member, said at least one support member including a first end, a second end disposed opposite and distal from the first end, a first edge, a second edge disposed opposite and distal from the first edge, and a plurality of apertures extending from the first edge toward the second edge, said apertures being structured to receive said electrical bus members; and a fastener assembly structured to support said at least one support member between the first side of said housing of said electrical enclosure and the second side of said housing, wherein each of said at least one support member is structured to extend only a portion of the width between the first side of said housing of said electrical enclosure and the second side of said housing, wherein said at least one support member is structured to support said electrical bus members, without being attached to said housing of said electrical enclosure at a location between the first side of said housing and the second side of said housing, and wherein said at least one support member is a single support member; wherein said fastener assembly comprises a spacer and a plurality of fasteners; wherein the first end of said single support member is structured to be coupled to the first side of said housing of said electrical enclosure; wherein said fasteners fasten the second end of said single support member to said spacer; and wherein said spacer is structured to be coupled to the second side of said housing of said electrical enclosure.

7. The support assembly of claim 6 wherein the width of said housing of said electrical enclosure is about 22 inches; and wherein said at least one support member has a width of about 11 inches.

8. A support assembly for an electrical enclosure, said electrical enclosure including a housing having a first side and a second side disposed opposite and distal from the first side, a plurality of electrical bus members, and at least one electrical switching apparatus structured to be disposed between the first side of said housing and the second side of said housing, said housing having a width between the first side and the second side, each of said electrical bus members being structured to be electrically connected to a corresponding one of said at least one electrical switching apparatus, said support assembly comprising:

at least one support member, said at least one support member including a first end, a second end disposed opposite and distal from the first end, a first edge, a second edge disposed opposite and distal from the first edge, and a plurality of apertures extending from the first edge toward the second edge, said apertures being structured to receive said electrical bus members; and a fastener assembly structured to support said at least one support member between the first side of said housing of said electrical enclosure and the second side of said housing, wherein each of said at least one support member is structured to extend only a portion of the width between the first side of said housing of said electrical enclosure and the second side of said housing, wherein said at least one support member is structured to support said electrical bus members, without being attached to said housing of said electrical enclosure at a location between the first side of said housing and the second side of said housing, and wherein at least one of the first end of said at least one support member and the second end of said at least one support member comprises a tab extending outwardly from the first edge; wherein said at least one support member further includes a number of walls extending generally perpendicularly from the first edge to the second edge; wherein said fastener assembly comprises a plurality of fasteners; wherein a first one of said fasteners extends through said tab; wherein a second one of said fasteners is structured to extend through one of said number of walls in order to fasten a corresponding one of said electrical bus members to said at least one support member at or about a corresponding one of said apertures of said at least one support member; and wherein said first one of said fasteners and said second one of said fasteners are separated by a number of predetermined minimum distances.

9. The support assembly of claim 8 wherein said tab includes a projection extending outwardly from said tab; wherein said projection includes a recess having a predetermined first diameter; wherein said first one of said fasteners includes a washer; wherein said washer has a predetermined second diameter; and wherein said predetermined second diameter of said washer is substantially the same as said first diameter of said recess in order to ensure that only a washer having said predetermined second diameter is received in said recess, thereby ensuring said number of predetermined minimum distances is maintained.

10. An electrical enclosure comprising:
a housing having a first side, a second side disposed opposite and distal from the first side, and a width between the first side and the second side;
a plurality of electrical bus members;
at least one electrical switching apparatus disposed between the first side of said housing and the second side of said housing, each of said electrical bus members being electrically connectable to a corresponding one of said at least one electrical switching apparatus; and
a support assembly comprising:
at least one support member, said at least one support member including a first end, a second end disposed opposite and distal from the first end, a first edge, a second edge disposed opposite and distal from the first edge, and a plurality of apertures extending from the first edge toward the second edge, said apertures receiving said electrical bus members, and a fastener assembly supporting said at least one support member between the first side of said housing of said electrical enclosure and the second side of said housing, wherein each of said at least one support member extends only a portion of the width between the first side of said housing of said electrical enclosure and the second side of said housing, wherein said at least one support member supports said electrical bus members, without being attached to said housing of said electrical enclosure at a location between the first side of said housing and the second side of said housing, wherein said at least one support member is a first support member and a second support member; wherein the first end of said first support member is coupled to the first side of said housing of said electrical enclosure; wherein the second end of said first support member is coupled to the first end of said second support member; and wherein the second end of said second support member is coupled to the second side of said housing, and wherein said fastener assembly comprises a plate member and a plurality of fasteners; wherein said plate member overlaps the second end of said first support member and the first end of said second support member; and wherein a number of said fasteners is inserted through said plate member and at least one of said first support member and said second support member in order to fasten said first support member to said second support member.

11. The electrical enclosure of claim 10 wherein the second end of said first support member comprises a number of first protrusions; wherein the first end of said second support member comprises a number of second protrusions; wherein said plate member includes a number of first apertures and a number of second apertures; and wherein, when said first support member and said second support member are disposed in a predetermined orientation, each of said number of first protrusions is disposed in a corresponding one of said number of first apertures and each of said number of second protrusions is disposed in a corresponding one of said number of second apertures.

12. The electrical enclosure of claim 10 wherein said first support member and said second support member are substantially identical.

13. The electrical enclosure of claim 10 wherein the second end of said first support member comprises a number of first tabs; wherein the first end of said second support member comprises a number of second tabs; and wherein said number of second tabs at least partially overlaps said number of first tabs.

14. The electrical enclosure of claim 10 wherein the first side of said housing of said electrical enclosure comprises a first frame; wherein the second side of said housing of said electrical enclosure comprises a second frame; wherein said housing of said electrical enclosure is devoid of any intermediate framework between the first frame and the second frame; and wherein said support assembly is coupled only to said first frame and said second frame.

15. The electrical enclosure of claim 10 wherein said at least one electrical switching apparatus is a first circuit breaker and a second circuit breaker; wherein said first circuit breaker and said second circuit breaker are disposed side-by-side between the first side of said housing of said electrical enclosure and the second side of said housing of said electrical enclosure; wherein said plurality of electrical bus members is a first plurality of runbacks electrically connectable to said first circuit breaker and a second plurality of runbacks electrically connectable to said second circuit breaker; wherein said at least one support member of said support assembly is a first support member and a second support member disposed beside and coupled to said first support member; wherein each runback of said first plurality of runbacks extends through a corresponding one of said apertures of said first support member; wherein each runback of said second plurality of runbacks extends through a corresponding one of said apertures of said second support member; and wherein said first support member is coupled to the first side of said housing of said electrical enclosure and the second support member is coupled to the second side of said housing, in order to support both said first plurality of runbacks and said second plurality of runbacks.

16. The electrical enclosure of claim 10 wherein said at least one electrical switching apparatus is a first electrical switching apparatus disposed proximate the first side of said housing and a second electrical switching apparatus disposed horizontally beside said first electrical switching apparatus and proximate the second side of said housing; wherein said electrical bus members comprise a plurality of first runbacks being electrically connectable to said first electrical switching apparatus and a plurality of second runbacks being electrically connectable to said second electrical switching apparatus; wherein said at least one support member is a first support member and a second support member; wherein said first support member supports said first runbacks with respect to said first electrical switching apparatus; and wherein said second support member supports said second runbacks with respect to said second electrical switching apparatus.

17. An electrical enclosure comprising:
a housing having a first side, a second side disposed opposite and distal from the first side, and a width between the first side and the second side;
a plurality of electrical bus members;
at least one electrical switching apparatus disposed between the first side of said housing and the second side of said housing, each of said electrical bus members being electrically connectable to a corresponding one of said at least one electrical switching apparatus; and
a support assembly comprising:
at least one support member, said at least one support member including a first end, a second end disposed opposite and distal from the first end, a first edge, a second edge disposed opposite and distal from the first edge, and a plurality of apertures extending from the first edge toward the second edge, said apertures receiving said electrical bus members, and
a fastener assembly supporting said at least one support member between the first side of said housing of said electrical enclosure and the second side of said housing,
wherein each of said at least one support member extends only a portion of the width between the first side of said housing of said electrical enclosure and the second side of said housing,
wherein said at least one support member supports said electrical bus members, without being attached to said housing of said electrical enclosure at a location between the first side of said housing and the second side of said housing, and
wherein said at least one support member is a single support member; wherein said fastener assembly comprises a spacer and a plurality of fasteners; wherein the first end of said single support member is coupled to the first side of said housing of said electrical enclosure; wherein the second end of said single support member is coupled to said spacer; and wherein said spacer is coupled to the second side of said housing of said electrical enclosure.

* * * * *